Patented Apr. 18, 1950

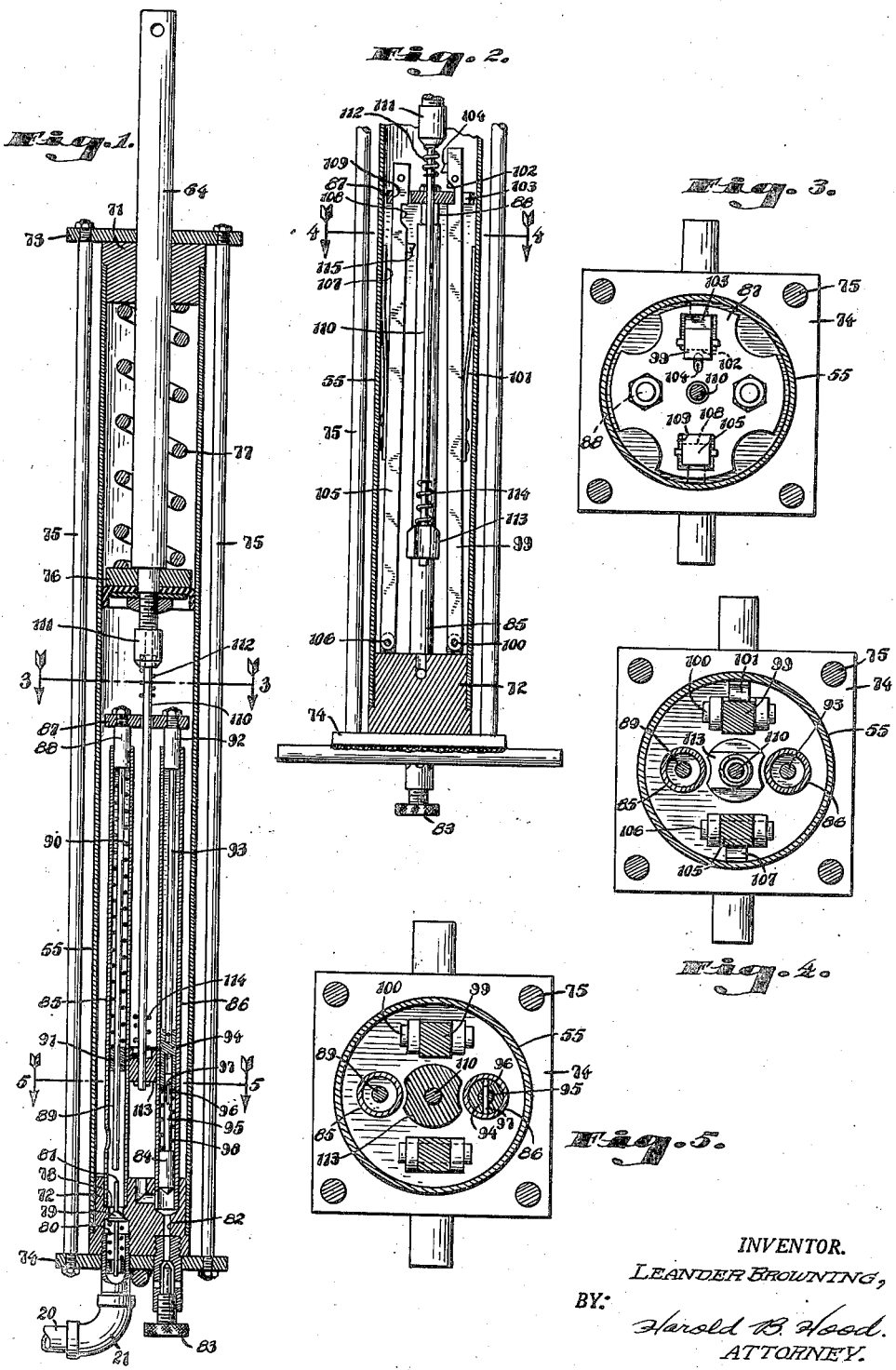

2,504,298

UNITED STATES PATENT OFFICE 2,504,298

FLUID MOTOR WITH AUTOMATIC VALVE ACTUATION

Leander Browning, Greenwood, Ind.

Original application July 16, 1947, Serial No. 761,215. Divided and this application December 10, 1948, Serial No. 64,510

4 Claims. (Cl. 121—164)

This is a division of my copending application, Serial Number 761,215, filed July 16, 1947, for "Spray boom device," and relates to a fluid motor device particularly adapted for use in my spray boom device, but capable of other uses. The primary object of this invention, then, is to provide fluid operated means for controlling the spray heads of a spray boom device to move said heads through a suitable arc, while controlling the tendency of the associated hoses to writhe or whip under the influence of the relatively heavy hydraulic pressure applied thereto, such means being of such character as automatically to move the spray heads continuously through a predetermined arc. A further object of the invention is to provide a novel fluid motor and novel valving means therefor. Still further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a vertical section through a fluid motor embodying the present invention;

Fig. 2 is a similar section of the lower portion of the motor, taken upon a plane 90° removed from the plane of Fig. 1;

Fig. 3 is a transverse section, upon an enlarged scale, taken on the line 3—3 of Fig. 1;

Fig. 4 is a similar section taken on the line 4—4 of Fig. 2; and

Fig. 5 is a similar section taken on the line 5—5 of Fig. 1.

In my said copending application, I have illustrated and described one environment in which my novel fluid motor device finds primary utility. According to that disclosure, a hose 20 leads from a source of air (or other fluid) under pressure to supply the fluid motor of the present invention.

Such motor comprises a cylinder 55 in which is reciprocably mounted a piston 76. The ends of the cylinder 55 are closed by blocks 71 and 72, held in place by closure plates 73 and 74 connected by tie rods 75. The piston 76 is rigidly connected to the stem 54, and a heavy coiled spring 77 is confined between said piston and the block 71, said spring continuously urging the piston 76 toward the block 72. The block 72 is formed with an inlet port 78 guarded by a reciprocating valve 79 which is positioned to move in a line parallel with the axis of the cylinder 55, and which is resiliently urged toward closing relation to the port 78 by a coiled spring 80. Said valve is provided with an actuating stem 81 projecting into the cylinder 55. The block 72 is further formed with an outlet port 82 with which cooperates a manually adjustable needle valve 83, and which is primarily controlled by an outlet valve 84 mounted for reciprocation in a line substantially parallel to the axis of the cylinder 55. The hose 20 is connected to a fitting 21 communicating with the housing of the inlet valve 79.

A guard tube 85 is associated with the valve 79 and its port and projects toward the opposite end of the cylinder; and a similar tube 86 is similarly associated with the outlet port 82.

Reciprocably mounted in the cylinder 55, between the piston 76 and the ports 78 and 82, is a spider-like carriage 87. Fixed to said carriage and movable therewith is a plunger 88 having guiding engagement in the tube 85, and having a reduced valve actuating extension 89 which extends into cooperative relation with the stem 81 of the valve 79. A spring 90 surrounds the projection 89 within the tube 85 and is confined between the plunger 88 and a fixed abutment 91 within the tube 85.

The carriage 87 similarly supports a second plunger 92 having guiding engagement in the tube 86 and having a reduced extension 93 which, within the tube 86, carries at its lower end a coupling element 94 in which is engaged the stem 95 of the outlet valve 84. Said stem is formed with an elongated slot 96 in which engages a pin 97 carried by the coupler 94; and a coiled spring 98 surrounds the valve stem 95 and is confined between the valve 84 and the coupling 94. It will be obvious that this arrangement holds the valve 84 resiliently in its position most remote from the coupling 94, but permits some telescoping of the stem 95 relative to the coupling 94.

A latch lever 99 is pivotally mounted at its lower end upon the block 72, as at 100, and projects into cooperative relation with the carriage 87. A leaf spring 101 carried on said latch lever engages the wall of the cylinder 55 and continuously urges the upper end of said lever to swing inwardly. Near its upper end, the lever is formed with a notch 102, and said lever is movably projected through a suitable slot 103 formed in the carriage 87. When said carriage is in registry with the notch 102, the spring 101 urges the lever into a position such as to engage the carriage within said notch to hold the carriage against downward movement, as is clearly illustrated in Fig. 2. At a point beyond the notch 103, the lever is provided with an inwardly projecting cam finger 104, for a reason which will appear hereinafter.

A second latch lever 105 is similarly pivotally mounted at 106, upon the block 72, at a point preferably 180° removed from the pivotal mounting 100. A leaf spring 107 is carried by said lever 105 to engage the wall of the cylinder 55 to urge said lever continuously inwardly. Near its upper end, the lever 105 is formed with a notch 108 for engagement with the carriage 87, when said carriage is in registry with said notch, to hold said carriage against upward movement. The lever projects through, and is movable in, a suitable slot 109 formed in the carriage 87.

Depending from the piston 76 and projecting through the carriage 87 so that one portion thereof is located between the piston 76 and the carriage 87 and another portion thereof is located between the carriage 87 and the valves 79 and 84, is a stem 110, fixed to the piston for movement therewith. Upon the first-mentioned portion of said stem is secured a release cam 111 for cooperation with the cam finger 104. Fixed to the nose of the cam 111 and projecting therebeyond, is a coiled spring 112. At the lower end of the stem 110 is carried an upwardly facing cam 113 for cooperation with the cam finger 115 on the lever 105, and a coiled spring 114 projects beyond the nose of the cam 113.

The operation of the illustrated motor is as follows: In the illustrated positions of the parts, the piston 76 is moving downwardly under the influence of the spring 77. The rate of movement thereof, of course, will depend upon the setting of the needle valve 83, which controls the rate of escape of air from the interior of the cylinder 55. As the piston moves downwardly, the spring 112 will engage, and be compressed against, the upper surface of the carriage 87; and after such compression has been accomplished, the cam 111 will strike the cam finger 104 to shift the lever 99, against the tendency of the spring 101, in a clockwise direction as viewed in Fig. 2. Thereby, the notch 102 will be disengaged from the carriage, and the carriage will be smartly moved downwardly under the influence of the expanding spring 112.

Such downward movement of the carriage 87 will shift the valve 84 into closing relation with its seat, to stop flow of air from the cylinder, and thereby arrest downward movement of the piston 76. At the same time, the rod 89 will strike the stem 81 and shift the valve 79 away from its seat, whereupon air will flow, from the source, through the hose 20 and inlet port 78, to the interior of the cylinder 55.

As the carriage 87 moves downwardly under the influence of the spring 112, it comes into registry with the notch 108 in the lever 105; and the spring 107 will move said lever in a clockwise direction, whereby engagement of the notch 108 with the carriage 87 will hold said carriage against upward movement. Thus, as air flows into the cylinder 55, the piston 76 will be moved upwardly against the tendency of the spring 77, but the carriage 87 will be held in its lowermost position, whereby the valve 79 will be held open and the valve 84 will be held closed. This condition will continue until the spring 114 engages the lower surface of the carriage 87 and is compressed thereagainst, whereafter the cam 113 will strike the cam finger 115 to shift the lever 105 in a counterclockwise direction, thereby releasing the carriage 87. The carriage will now move smartly upwardly under the influence of the expanding spring 114, to permit closure of the valve 79 by the spring 80, and to move the valve 84 away from its seat. As the carriage moves upwardly, it comes into registry with the notch 102 in the lever 99, and the spring 101 returns said lever to its illustrated position.

This cycle will be continued for so long as pressure fluid is supplied through the hose 20.

I claim as my invention:

1. A fluid motor comprising a cylinder, a piston reciprocably mounted in said cylinder, an inlet valve and an outlet valve adjacent one end of said cylinder, a carriage reciprocably mounted in said cylinder between said piston and said valves, means movable with said carriage and cooperable with said valves to shift the same relative to their seats, latch means cooperable with said carriage to hold the same against valve-actuating movement, spring means movable with said piston and engageable with said carriage, at times, to bias said carriage toward movement, and other means movable with said piston and acting directly upon said latch means only after such biasing of said carriage has been accomplished, to shift said latch means to release said carriage for movement under the effect of such bias.

2. A fluid motor comprising a cylinder, a piston reciprocably mounted in said cylinder, an inlet valve and an outlet valve adjacent one end of said cylinder, a carriage reciprocably mounted in said cylinder between said piston and said valves, means movable with said carriage and cooperable with said valves to shift the same relative to their seats, a first latch means cooperable with said carriage, at times, to hold the same against movement in one direction, a second latch means cooperable with said carriage, at other times, to hold the same against movement in the opposite direction, an element movable with said piston, a first spring movable with said element and engageable with said carriage, at times when said first latch means is effective, to bias said carriage toward movement in said one direction, a first release means movable with said element and cooperable with said first latch means only after such biasing of said carriage has been accomplished, to shift said first latch means to release said carriage for movement in said one direction, a second spring movable with said element and located on the side of said carriage opposite the position of said first spring, said second spring being engageable with said carriage, at times when said second latch means is effective, to bias said carriage toward movement in said opposite direction, and a second release means movable with said element and cooperable with said second latch means only after the last-named biasing has been accomplished, to shift said second latch means to release said second latch means to release said carriage for movement in said opposite direction.

3. The motor of claim 2 in which said valves are arranged for movement substantially axially of said cylinder and in which movement thereof in a substantially common direction tends to open one valve and to close the other.

4. A fluid motor comprising a cylinder, a piston reciprocably mounted in said cylinder, means resiliently urging said piston toward a closed end of said cylinder, said cylinder end being provided with an inlet port and an outlet port, an outwardly-opening inlet valve associated with said inlet port and movable toward and away from closing relation thereto generally in the direction of the length of said cylinder, an inwardly-opening outlet valve associated with said outlet port and movable toward and away from closing relation thereto generally in the direction of the length of said cylinder, a carriage reciprocably mounted in said cylinder between said piston and said cylinder end and carrying an actuator cooperable with said inlet valve to open the inlet port and an actuator cooperable with said outlet valve to close the outlet port upon movement of said carriage toward said cylinder end, movement of said carriage away from said cylinder end being accompanied by closure of said inlet valve and opening of said outlet valve, a shifter element operatively connected with said piston to move in response to movement of said piston, a portion of said shifter element being disposed between said piston and said carriage and a portion of said shifter element being disposed between said carriage and said cylinder end, a latch lever pivotally mounted within said cylinder and formed with a notch engageable, at times, with said carriage to hold said carriage against movement toward said cylinder end, means resiliently resisting carriage-releasing movement of said lever, a coiled spring carried upon and movable with the first-named portion of said shifter element, said spring being engageable with, and compressible against, said carriage as said piston approaches the limit of its movement toward said cylinder end, cam means movable with said piston and cooperable with said lever, after compression of said last-named spring, to disengage said latch lever from said carriage, a second latch lever pivotally mounted within said cylinder and formed with a notch engageable, at times, with said carriage to hold said carriage against movement away from said cylinder end, means resiliently resisting carriage-releasing movement of said second lever, a coiled spring carried upon and movable with the second-named portion of said shifter element, said spring being engageable with, and compressible against, said carriage as said piston approaches the limit of its movement away from said cylinder end, and cam means movable with said piston and cooperable with said second lever, after compression of said last-named spring, to disengage said second latch lever from said carriage.

LEANDER BROWNING.

REFERENCES CITED

The following references are of record in the file of this patent:

UNITED STATES PATENTS

| Number | Name | Date |
| --- | --- | --- |
| 1,845,176 | Palm | Feb. 16, 1932 |
| 1,907,949 | Gage | May 9, 1933 |
| 2,245,501 | Richardson | June 10, 1941 |
| 2,258,493 | Hull | Oct. 7, 1941 |
| 2,366,777 | Farley et al. | Jan. 9, 1945 |